(12) United States Patent
Matthijsse et al.

(10) Patent No.: US 7,734,135 B2
(45) Date of Patent: Jun. 8, 2010

(54) METHOD AND DEVICE FOR MANUFACTURING OPTICAL PREFORMS, AS WELL AS THE OPTICAL FIBRES OBTAINED THEREWITH

(75) Inventors: Pieter Matthijsse, Hapert (NL); Mattheus Jacobus Nicolaas Van Stralen, Tilburg (NL); Henrikus Lambertus Maria Jansen, Bergeijk (NL); Johanna Catharina van Lierop Jansen, legal representative, Bergeijk (NL); Antonius Cornelis Johannes Maria De Vetter, Veldhoven (NL); Marinus Jacob De Fouw, Eindhoven (NL)

(73) Assignee: Draka Comteq B.V., Amsterdam (NL)

( * ) Notice: Subject to any disclaimer, the term of this patent is extended or adjusted under 35 U.S.C. 154(b) by 963 days.

(21) Appl. No.: 10/509,684

(22) PCT Filed: Apr. 7, 2003

(86) PCT No.: PCT/NL03/00261

§ 371 (c)(1),
(2), (4) Date: Jul. 21, 2006

(87) PCT Pub. No.: WO03/086998

PCT Pub. Date: Oct. 23, 2003

(65) Prior Publication Data

US 2007/0003197 A1     Jan. 4, 2007

(30) Foreign Application Priority Data

Apr. 10, 2002   (NL)  .................................... 1020358

(51) Int. Cl.
*G02B 6/02* (2006.01)
*C03B 37/018* (2006.01)
*C03C 25/00* (2006.01)
*C23C 16/00* (2006.01)

(52) U.S. Cl. .......................... 385/123; 65/391; 118/723; 427/248.1

(58) Field of Classification Search ................. 385/123; 65/391
See application file for complete search history.

(56) References Cited

U.S. PATENT DOCUMENTS 4,264,131 A * 4/1981 Sawamura et al. .......... 385/142

(Continued)

FOREIGN PATENT DOCUMENTS

EP      1492735 A1    10/2003

(Continued)

OTHER PUBLICATIONS

Chinese Office Action in counterpart Chinese Patent Application No. 03813365, dated Mar. 24, 2006.

(Continued)

*Primary Examiner*—Charlie Peng
*Assistant Examiner*—Erin D Chiem
(74) *Attorney, Agent, or Firm*—Summa, Additon & Ashe, P.A.

(57) ABSTRACT

The present invention relates to a method and a device for manufacturing optical performs, in which one or more layers of glass, doped or undoped, are deposited onto the internal surface of a hollow substrate tube, which deposition is effected by supplying one or more reactive gas mixtures of glass-forming compounds tot the interior of the hollow substrate tube and subsequently generating a non-isothermal plasma in the hollow substrate tube, after which the preform is subjected to a contraction process for the purpose of forming a massive rod, from which optical fibres are drawn.

14 Claims, 1 Drawing Sheet

U.S. PATENT DOCUMENTS

| | | | |
|---|---|---|---|
| RE30,635 E | | 6/1981 | Kuppers et al. |
| 4,314,833 A | | 2/1982 | Kuppers |
| 4,493,721 A | | 1/1985 | Auwedra et al. |
| 4,557,566 A | * | 12/1985 | Kikuchi et al. ............... 359/652 |
| 4,746,345 A | | 5/1988 | Pluijms et al. |
| 4,844,007 A | | 7/1989 | Eikelboom |
| 4,857,091 A | * | 8/1989 | Geittner et al. ................ 65/391 |
| 5,049,406 A | * | 9/1991 | Geittner et al. ............. 427/572 |
| 5,203,691 A | | 4/1993 | OBrien, Jr. |
| 5,397,372 A | | 3/1995 | Partus et al. |
| 6,260,510 B1 | | 7/2001 | Breuls et al. |
| 2002/0000104 A1 | | 1/2002 | Ijiri et al. |
| 2003/0044117 A1 | | 3/2003 | Murashima et al. |
| 2004/0175084 A1 | | 9/2004 | Broeng et al. |
| 2007/0003197 A1 | | 1/2007 | Matthijsse et al. |

FOREIGN PATENT DOCUMENTS

| | | |
|---|---|---|
| JP | 58 099131 | 6/1983 |
| WO | 99 35304 | 7/1999 |
| WO | 03/086998 A1 | 10/2003 |

OTHER PUBLICATIONS

International Preliminary Examination Report in counterpart International Application No. PCT/NL03/00261, completed on Jul. 8, 2004.

International Search Report in counterpart International Application No. PCT/NL03/00261, mailed on Sep. 4, 2003.

European Office Action in counterpart European Application No. 03725865, dated Jul. 24, 2008.

* cited by examiner

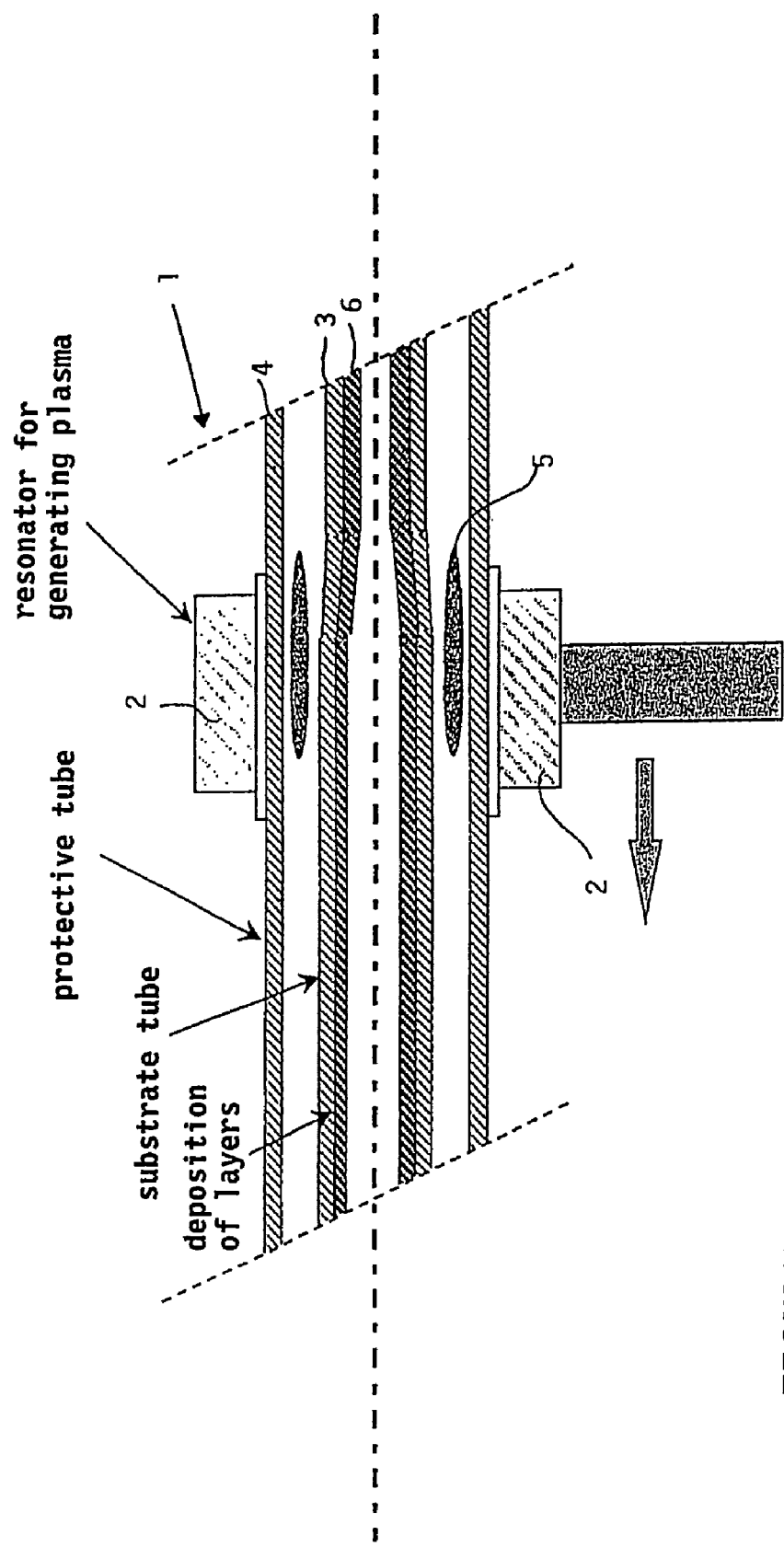
FIGURE

METHOD AND DEVICE FOR MANUFACTURING OPTICAL PREFORMS, AS WELL AS THE OPTICAL FIBRES OBTAINED THEREWITH

The present invention relates to a method and a device for manufacturing optical preforms, in which one or more layers of glass, doped or undoped, are deposited onto the internal surface of a hollow substrate tube, which deposition is effected by supplying one or more reactive gas mixtures of glass-forming compounds to the interior of the hollow substrate tube and subsequently generating a non-isothermal plasma in the hollow substrate tube, after which the hollow substrate tube or preform, on the internal surface of which a plurality of layers of glass obtained by means of a deposition process are present, is subjected to a contraction process for the purpose of forming a massive rod, from which optical fibres are drawn. The present invention furthermore relates to optical fibres that are obtained by using such a method and device.

From U.S. Pat. No. 4,746,345 there is known a method of manufacturing solid quartz glass preforms from hollow substrate tubes, in which a plasma burner consisting of two, quartz tubes and a coil is reciprocated along the length of a hollow substrate tube. The plasma is ignited and maintained in the gaseous atmosphere that envelopes the substrate tube to be contracted, in which the dimension of the plasma burner is significantly smaller than the length of a substrate tube.

From U.S. Pat. No. 5,203,691 there is known a burner which is used for contracting hollow substrate tubes into solid massive preforms, which process does not employ plasma, however.

A method of manufacturing optical fibres is known per se from U.S. Pat. Nos. 4,314,833; 4,844,007 and Re. 30,635. The optical fibres produced by such a method may consist of a core of doped silica glass and a cladding of undoped silica glass. Alternatively, the fibre may consist of a core of either undoped or doped silica glass, a first cladding layer of doped silica glass, and an outer cladding of undoped silica glass. The dopant, depending on its type, may increase or decrease the refractive index of silica. Dopants such as $GeO_2$, $Al_2O_3$, and $TiO_2$ will increase the refractive index, while dopants such as $B_2O_3$, or F will decrease the refractive index. In an optical fibre, the refractive index of the core layer material is higher than the layer of glass surrounding the core. There may be a stepped increase or a parabolic increase of the core refractive index.

In the aforesaid two US patents, the preform from which the optical fibre is drawn in a draw tower is produced in two separate steps, viz. a) the deposition of a number of thin, doped or undoped layers of quartz on the internal surface of the hollow preform or substrate tube, followed by b) the contracting or collapsing process, in which the previously obtained hollow substrate tube, which is internally coated with layers of quartz, is formed into the final massive preform by moving high-temperature heating means along the tube. According to this known PCVD-process, the deposition of the doped or undoped layers of quartz on the interior of the hollow substrate tube is effected by generating a plasma in a reactive gas mixture that is present within the substrate tube. Said reactive gas mixture is maintained at the desired chemical composition and the desired low pressure by means of a control system, and the plasma is generated by microwave rays whose energy is coupled into the ionised reactive gas mixture in a substrate tube from a resonator which is disposed outside the substrate tube. A so-called circular symmetrical deposition of layers of glass, which is substantially uniform in the longitudinal direction of the hollow substrate tube, is obtained by moving the resonator in the longitudinal direction with respect to the hollow substrate tube. In order to achieve an optimum deposition process, the hollow substrate tube is maintained at a temperature of about 1200° C. by placing the whole of substrate tube and moving resonator in a movable furnace, in which the resonator is provided with an insulating envelope so as to ensure the proper functioning thereof, and in which furthermore cooling of the resonator takes place. After completion of the deposition process as described above, the substrate tube comprising the layers of glass internally deposited thereon is manually removed from the PCVD apparatus and subsequently set up in a contraction apparatus. Usually, a hydrogen-oxygen burner or an electrical furnace is used for the contraction process, in which case the hollow substrate tube is formed into the desired massive preform in a number of passes. A massive rod thus obtained, also called preform, possibly being externally coated with additional glass, is set up in a draw tower and an optical fibre is drawn therefrom.

The process of preform manufacture as described above can thus be considered to be a method in which two separate process steps can be distinguished, each step to be carried out in a separate apparatus. An important drawback is the fact that, owing to the cooling of the substrate tube that takes place upon transfer of the tube, the internal stress in the layers deposited on the interior of the substrate tube will increase to such an extent that a so-called "layer breakage" will occur, which renders the substrate tube unsuitable for further processing in the draw tower. Such a "layer breakage" results in preform losses, which phenomenon occurs in particular when manufacturing preforms exhibiting a high refractive index contrast or large differences between the coefficients of thermal expansion of the deposited layers resulting from the use of one or more types of dopants. Such a phenomenon occurs in particular when producing specific types of multimode fibres, fibres for sensor applications, photosensitive fibres, fibres for dispersion compensating modules, fibres containing special reinforcing dopants for amplification properties and the like. It is desirable to use higher refractive index contrasts, higher amounts of dopants and/or different types of dopants when designing such fibres. The production techniques that are commercially available at present only allow the production of fibres having a maximum refractive index contrast of about 2%, however, and the fibres are usually so-called graded index fibres. It is desirable, therefore, that optical fibres be produced in which specific layers exhibit a refractive index contrast higher than the that which is known according to the prior art, in particular a value higher than 2.5%.

If it is decided to use dopants in a specific layer of an optical fibre whose structure strongly differs from the undoped quartz structure, this will lead to major differences between the coefficients of thermal expansion. In the prior art, a maximum difference of $3.2 \times 10^{-6} K^{-1}$ in the coefficients of thermal expansion of the various layers arranged adjacently to each other was considered to be attainable when manufacturing optical fibres. If, on the other hand, it should be decided to use special dopants, it is desirable that optical fibres be produced in which the differences between the coefficients of thermal expansion of the layers arranged adjacently to each other may be larger than the aforesaid value, in particular larger than $3.4 \times 10^{-6} K^{-1}$.

It should be understood that if layers exhibiting large differences in the coefficients of thermal expansion are present in the substrate tube, stress differences between the layers may occur upon cooling down, which may lead to the development of lines of fracture in the various layers, and, in the worst case, to fracture of the entire preform. In practice it has moreover become apparent that the aforesaid separate process steps may lead to drawbacks, in particular upon removal of the substrate tube from the PCVD apparatus and the subsequent setting-up of the substrate tube in the contraction apparatus, which operations may lead to fouling of the internal surface of the substrate tube.

One aspect of the present invention is thus to provide a method and a device for manufacturing optical preforms which do not exhibit the problems of the prior art as referred to above.

Another aspect of the present invention is to provide a method and a device for manufacturing optical preforms, which optical preforms are composed so that optical fibres exhibiting a high refractive index contrast can be drawn therefrom.

Another aspect of the present invention is to provide a method and a device for manufacturing optical preforms, according to which optical fibres can be drawn from said optical preforms, which optical fibres are composed of one or more layers whose coefficients of thermal expansion differ strongly from each other.

Yet another aspect of the present invention is to provide a method and a device for manufacturing optical preforms, according to which a non-isothermal plasma is used both in the contraction process and in the deposition process.

An additional object of the present invention is to provide a method and a device for manufacturing optical preforms, according to which the deposition process and the contraction process are carried out in one and the same device, viz. an integrated PCVD/collapsing machine.

The invention as referred to in the introduction is characterized in that the contraction process comprises the steps of:

i) providing a hollow substrate tube enveloped by a protective tube, which protective tube is stationary with respect to the hollow substrate tube, with the hollow substrate tube being enveloped by the protective tube along substantially the entire length thereof, ii) providing a resonator which surrounds the protective tube, iii) supplying a plasma-forming gas to the annular space present between the outer circumference of the hollow substrate tube and the inner circumference of the protective tube, iv) generating a non-isothermal plasma in said annular space, v) reciprocating the resonator in longitudinal direction with respect to the protective tube for the purpose of contracting the hollow preform into a massive rod, followed by controlled cooling thereof.

The use of a protective tube as described in step i) makes it possible to use the same microwave energy source that is used for the deposition process and for the contraction process as well. Thus, a plasma to be used in the contraction process is generated in the annular space present between the outer circumference of the hollow substrate tube and the inner circumference of the protective tube, which plasma generation takes place in such a manner that the microwave energy being used is relatively high whilst the resonator speed is low. In addition, the special construction of the protective tube and the substrate tube, according to which in particular the substrate tube is enveloped by the protective tube along substantially the entire length thereof, enables a reproducible and controllable contraction of the substrate tube. In the present description the term hollow substrate tube or preform is consistently used. These two terms are in fact considered to be synonyms by those skilled in the art, and it will become apparent from the context whether or not layers are already internally deposited thereon.

In a special embodiment it is desirable to introduce a gas having a high temperature into the annular space present between the outer circumference of the hollow substrate tube and the inner circumference of the protective tube during the deposition process. This makes it possible for the outer wall of the substrate tube to reach the same temperature as in the situation in which an external furnace is used.

In a special embodiment, on the other hand, it is possible to carry out the present contraction process in such a manner that the same plasma that was used for the deposition process is also used in carrying out the first contraction step. Such an embodiment enables much smaller differences to be chosen between the diameter of the outer circumference of the substrate tube and that of the outer circumference of the protective tube than originally. In addition to that, the conditions in which the circular plasma is to be generated in the annular space in such an embodiment are significantly more favourable than in the situation in which a large difference between the respective diameters is employed.

It is in particular preferable to keep the hollow substrate tube and the protective tube in a horizontal position while carrying out the steps i)-iv), with the hollow substrate tube being rotated in particular during step v).

In order to obtain a uniform contraction of the substrate tube, the plasma is preferably adapted to the increased volume of the annular space during step v).

Preferably, a mixture of argon and oxygen is used as a suitable plasma-forming gas to be used in step iii), in which the pressure during the contraction process is preferably <50 mbar, in particular 10-25 mbar.

It should be understood that the contraction into a fully massive rod can be terminated prematurely in step v), for which contraction, as described at some length in the foregoing, the same plasma as used in the deposition process and/or the plasma generated in the annular space may be used. Such premature termination may be desirable for special products or in order to have the closing of the preform take place in the melting zone of the draw tower.

Preferably, the protective tube is made of a ceramic material having a higher plasticizing temperature than the material of the hollow substrate tube to be contracted, in order to prevent the protective tube that envelopes the hollow substrate tube from plasticizing during step v) already.

In a special embodiment, in which repeated use of the protective tube for carrying out the steps i)-v) must be possible, the protective tube is preferably provided with cooling means, for example by forming hollow channels in the outer wall of the protective tube, in order to prevent premature contraction of the protective tube.

In a special embodiment, the protective tube used in step i) preferably functions as a jacket tube for the massive preform as well, which means that the contraction process comprises an additional step vi), which step vi) comprises the reciprocating of the resonator in longitudinal direction with respect to the protective tube for the purpose of contracting the protective tube, and the subsequent controlled cooling thereof. In such an embodiment the protective tube can be considered to be a jacket tube for the massive preform, after which the whole is set up in the draw tower as a complete preform for producing optical fibres.

In particular, the deposition process and the contraction process are carried out in one and the same device, in which the construction for effecting the rotating passage is designed such that the removal of the eventually obtained massive preform and the protective tube can take place in a simple manner. In order to obtain such a construction, clamps supporting the protective tube and the end of the substrate tube have an open construction.

It should be understood that the gas being used in step iii) may comprise one or more glass-forming compounds, so that an additional deposition takes place on the inner circumference and/or the outer circumference of the hollow protective tube.

Using the present invention, it is thus possible to manufacture optical preforms which exhibit a high refractive index contrast or large differences between the coefficients of thermal expansion of the various layers deposited on the interior of the hollow substrate tube.

The present invention thus furthermore relates to an optical fibre characterized in that the refractive index contrast $$\Delta_i = \frac{n_i^2 - n_{cl}^2}{2 \cdot n_i^2} \cdot 100\%$$

wherein:
$\Delta_i$=refractive index contrast of specific layer i,
$n_i$=refractive index of layer i,
$n_{cl}$=refractive index of the cladding, i.e. the outer layer of the fibre
has a value wherein $\Delta_i > 2.5\%$, in particular $\Delta_i > 3\%$.

The present invention furthermore relates to an optical fibre characterized in that in that the thermal coefficient of expansion $$\alpha = \frac{1}{l_0} \cdot \frac{\Delta l}{\Delta T} [K^{-1}]$$

measured at a temperature of 25-300° C., wherein:
l=length at $T_1$
$l_0$=length at $T_0$
$\Delta T=(T_1-T_0)$
$\Delta l=(l-l_0)$
has a value according to which $\alpha > 3.4 \cdot 10^{-5} K^{-1}$, in particular $\alpha > 4.0 \cdot 10^{-6} K^{-1}$.

The present invention furthermore relates to a device for carrying out the method as described above and defined in the independent apparatus claim.

The present invention will be explained in more detail hereinafter by means of an example and with reference to a FIGURE; it should be noted, however, that the present invention is by no means limited to such a special example and such a FIGURE.

The appended FIGURE schematically shows the position of the protective tube and the substrate tube according to the present invention.

EXAMPLE

The construction 1 that is shown in the FIGURE comprises the situation in which deposition of layers of glass (indicated at 6) on the internal surface of the substrate tube 3 has already taken place. The substrate tube 3 or preform 3 is enveloped by a protective tube 4, which protective tube 4 is surrounded by a device 2 for generating plasma, in particular a resonator which can be moved along the length of the protective tube 4. The generation of the plasma in the annular space (indicated at 5) present between the outer circumference of the preform 3 and the inner circumference of the protective tube 4 results in contraction of the preform 3 for the purpose of obtaining a massive or non-massive rod.

The present invention has been implemented in the design of a preform doped with dopant A ($GeO_2$). The resulting maximum index contrast thereof is more than 2.5% and the difference between the coefficient of thermal expansion of this layer and that of the cladding is greater than $3.4 \cdot 10^{-6}$ $K^{-1}$. The present invention has also been implemented in the design of a preform doped with dopant A as described above, and with substance B as a co-dopant. The difference between the coefficient of thermal expansion of this layer and that of the cladding is greater than $4 \cdot 10^{-6}$ $K^{-1}$ in this case.

The protective tube being used is a tube having an external diameter of 34 mm and a wall thickness of 4 mm. The substrate tube being used has an external diameter of 22 mm and a wall thickness of 2 mm. Given a thickness of the deposited material of 1 mm in total, a massive rod of 14.6 mm is obtained after contraction in the case of a substrate tube firing loss during contraction of about 10%. After fitting of a separate jacket tube having a cross-sectional area of 300 mm², the preform from which the desired optical fibre can be drawn is obtained. In the case of a diameter of 125 µm, the desired core diameter of 7 µm results if 0.029 mm of the final deposited layers has been deposited as the core material during the PCVD-process. The diameter of the total deposited layers in the fibre is 48.5 µm. Given a useful preform length of 40 cm, a length of fibre of 15 km can be produced from said preform.

The invention claimed is:

1. A method for manufacturing optical preforms, in which one or more layers of glass, doped or undoped, are deposited onto the internal surface of a hollow substrate tube, which deposition is effected by supplying one or more reactive gas mixtures of glass-forming compounds to the interior of the hollow substrate tube and subsequently generating a non-isothermal plasma in the hollow substrate tube, after which the hollow substrate tube provided with layers of glass via a deposition process is subjected to a contraction process for the purpose of forming a massive rod, from which optical fibres are drawn, characterized in that the contraction process comprises the steps of:
   i) providing a hollow substrate tube enveloped by a protective tube, which protective tube is stationary with respect to the hollow substrate tube, with the hollow substrate tube being enveloped by the protective tube along substantially the entire length thereof,
   ii) providing a resonator which surrounds the protective tube,
   iii) supplying a plasma-forming gas to the annular space present between the outer circumference of the hollow substrate tube and the inner circumference of the protective tube,
   iv) generating a non-isothermal plasma in said annular space,
   v) reciprocating the resonator in a longitudinal direction with respect to the protective tube for the purpose of contracting the hollow substrate tube into a massive rod.

2. A method according to claim 1, characterized in that the hollow substrate tube and the protective tube are kept in a horizontal position while steps i)-iv) are being carried out.

3. A method according to claim 1 or claim 2, characterized in that the hollow substrate tube is rotated during step v), followed by controlled cooling thereof.

4. A method according to claim 1, characterized in that the plasma is adapted to the increased volume of the annular space during step v).

5. A method according to claim 1, characterized in that a mixture of argon and oxygen is used as a plasma-forming gas.

6. A method according to claim 1, claim 2, or claim 5, characterized in that the pressure during the contraction process is <50 mbar.

7. A method according to claim 1, characterized in that a gas having a high temperature during the deposition process is introduced into said annular space.

8. A method according to claim 1, claim 2, or claim 5, characterized in that the protective tube is made of a ceramic material having a higher plasticizing temperature than the material of the hollow substrate tube to be contracted.

9. A method according to claim 1, characterized in that the contraction process comprises an additional step vi), which step vi) comprises the reciprocating of the resonator in longitudinal direction with respect to the protective tube for the purpose of contracting the protective tube.

10. A method according to claim 1, characterized in that the protective tube is provided with cooling means.

11. A method according to claim 1, claim 2, or claim 5, characterized in that the deposition process and the contraction process are carried out in the same device.

12. A method according to claim 1, characterized in that one or more glass-forming compounds are added to the gas used in step iii).

13. A method according to claim 1, characterized in that the contraction into a fully massive rod is terminated prematurely in step v), for which contraction the same plasma as used in the deposition process and/or the plasma generated in the annular space may be used.

14. A method according to claim 1, characterized in that the pressure during the contraction process is between about 10 mbar and 25 mbar.

* * * * *

UNITED STATES PATENT AND TRADEMARK OFFICE
CERTIFICATE OF CORRECTION

PATENT NO. : 7,734,135 B2  Page 1 of 1
APPLICATION NO. : 10/509684
DATED : June 8, 2010
INVENTOR(S) : Pieter Matthijsse et al.

It is certified that error appears in the above-identified patent and that said Letters Patent is hereby corrected as shown below:

On the Title Page, Item (57) in the Abstract
Line 2 reads "manufacturing optical ~~performs,~~ in which one or more layers"
and should read "manufacturing optical preforms, in which one or more layers"

Column 5, line 43 reads "$\alpha > 3.4 \cdot 10^{-5} K^{-1}$" and should read "$\alpha > 3.4 \cdot \underline{10^{-6}} K^{-1}$"

Column 6, line 8 reads "$3.4 \cdot 10^{-6} K^{-1}$" and should read "$3.4 \cdot \underline{10^{-6}} K^{-1}$"

Signed and Sealed this

Twenty-third Day of November, 2010

David J. Kappos
*Director of the United States Patent and Trademark Office*